(12) United States Patent
Kamm et al.

(10) Patent No.: US 7,497,802 B2
(45) Date of Patent: Mar. 3, 2009

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 216 days.

(21) Appl. No.: 11/732,245

(22) Filed: Apr. 3, 2007

(65) Prior Publication Data

US 2008/0015077 A1    Jan. 17, 2008

(30) Foreign Application Priority Data

Apr. 6, 2006   (DE) ...................... 10 2006 016 191

(51) Int. Cl.
    *F16H 3/44* (2006.01)
(52) U.S. Cl. ....................... 475/282; 475/288
(58) Field of Classification Search .......... 475/275–292
    See application file for complete search history.

(56) References Cited

U.S. PATENT DOCUMENTS

| | | | |
|---|---|---|---|
| 4,884,471 A * | 12/1989 | Daggett et al. | 475/285 |
| 6,176,803 B1 | 1/2001 | Meyer et al. | |
| 6,634,980 B1 | 10/2003 | Ziemer | |
| 6,960,149 B2 | 11/2005 | Ziemer | |
| 7,014,589 B2 | 3/2006 | Stevenson | |
| 7,018,319 B2 | 3/2006 | Ziemer | |
| 7,037,232 B2 * | 5/2006 | Ishimaru | 475/275 |
| 7,101,305 B2 * | 9/2006 | Tabata et al. | 475/296 |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 101 15 983 | 10/2002 |
| DE | 101 15 995 | 10/2002 |
| DE | 10 2004 029 952 A1 | 1/2005 |
| DE | 10 2005 002 337 | 8/2006 |

* cited by examiner

*Primary Examiner*—Roger Pang
(74) *Attorney, Agent, or Firm*—Davis & Bujold, P.L.L.C.

(57) ABSTRACT

The multi-speed transmission has shafts, planetary gearsets (RS1, RS2, RS3, RS4) and shifting elements (A, B, C, D, E). Carrier (ST4) of gearset (RS4) and the input shaft couple as shaft (1). Carrier (ST3) of gearset (RS3) and the output shaft couple as shaft (2). Sun gears (SO1, SO4) of gearsets (RS1, RS4) couple as shaft (3). Ring gear (HO1) of gearset (RS1) forms shaft (4). Sun gear (SO3) forms shaft (5). Carrier (ST1) of gearset (RS1) and ring gear (HO3) of gearset (RS3) couple as shaft (6). Sun gear (SO2) of gearset (RS2) and carrier (ST4) of gearset (RS4) couple as shaft (7). Ring gear (HO2) is shaft (8). In the flow of power, elements (A, B) are respectively between shafts (3, 4) and a transmission housing; element (C) is between shafts (1, 5); element (D) is between shafts (2, 8); and element (E) is between shafts (5, 7).

34 Claims, 4 Drawing Sheets

Fig. 1

| GEAR | ENGAGED SHIFTING ELEMENTS | | | | | RATIO $i$ | STEP $\varphi$ |
|---|---|---|---|---|---|---|---|
| | BRAKE | | CLUTCH | | | | |
| | A | B | C | D | E | | |
| 1 | ● | ● | ● | | | 4.70 | |
| | | | | | | | 1.50 |
| 2 | ● | ● | | | ● | 3.13 | |
| | | | | | | | 1.49 |
| 3 | | ● | ● | | ● | 2.10 | |
| | | | | | | | 1.26 |
| 4 | | ● | | ● | ● | 1.67 | |
| | | | | | | | 1.30 |
| 5 | | ● | ● | ● | | 1.28 | |
| | | | | | | | 1.28 |
| 6 | | | ● | ● | ● | 1.00 | |
| | | | | | | | 1.19 |
| 7 | ● | | ● | ● | | 0.84 | |
| | | | | | | | 1.27 |
| 8 | ● | | | ● | ● | 0.67 | |
| R | ● | ● | | ● | | −3.53 | TOTAL 7.05 |

MULTI-SPEED TRANSMISSION

This application claims priority from German Application Serial No. 10 2006 016 191.2 filed Apr. 6, 2006.

FIELD OF THE INVENTION

The present invention concerns a multi-speed transmission, employing planetary gear sets, in particular, an automatic transmission for a motor vehicle, encompassing one input shaft, one output shaft, four planetary gear sets, at least eight rotatable shafts, as well as five shifting elements, the selective engagement of which determines different ratio relationships between the input shaft and the output shaft, so that eight forward gears and one reverse gear are realizable.

BACKGROUND OF THE INVENTION

Automatic transmissions, especially for motor vehicles, encompass, in accord with their state of the technology, planetary gear sets. Further the transmissions are shifted by means of friction elements or shifting elements, such as clutches and/or brakes and normally possess a start-up element. The start-up element is subjected to slip action and optionally has a converter lock-up clutch, somewhat in the manner of a connection with a hydrodynamic torque converter or a fluid clutch.

Within the general framework of DE 101 15 983 A1, the applicant, for instance, has described a multi-speed transmission having an input shaft, which is connected to an input-side planetary gear set and being further equipped with an output shaft, which is connected to an output side planetary gear set. The described multi-speed transmission also has a maximum of seven shifting elements, by means of the selective shifting thereof, seven forward gears can be implanted, without the intervention of range-shifting. The input side planetary gear set is constructed from a shiftable or a non-shiftable planetary gear set, or alternately, from a maximum of two non-shiftable, mutually coupled planetary gear sets. The output side planetary gear set is designed as a two carrier, four shaft transmission with two shiftable planetary gear sets and possesses four free shafts. The first free shaft of this two carrier, four shaft transmission is bound to the first shifting element, the second free shaft connects with the second and third shifting elements, the third free shaft is connected to the fourth and fifth shifting elements and the fourth free shaft is bound with the output shaft. In the case of a multi-speed transmission, which has a total of six shifting elements, in accord with the invention, the proposal is made, that the third free shaft or the first free shaft of the output sided planetary gear set, should be bound additionally to a sixth shifting element. With a multi-speed transmission having a total of seven shifting elements, in accord with the invention, a proposal is made, that the third free shaft be connected to sixth shifting element and the first free shaft be additionally connected to a seventh shifting element.

A plurality of other multi-speed transmissions are, for example, also disclosed by DE 101 15 995 A1 of the applicant, wherein four shiftable, mutually coupled planetary gear sets and six or seven friction-based shifting elements are provided, by the selective closure thereof, the speed of rotation of the input shaft of the transmission is so transferred to the output shaft of the transmission, such that nine or eleven forward gears may be implemented and at least one reverse gear can be shifted into. In accord with the shifting diagram (FIG. 2), it is seen, that in each gear, two or three shifting elements are closed, whereby, by means of a change from one gear to another gear which is immediately the next higher or lower gear therefrom, in order to avoid group shifting, the shifting is completed by disengaging only one engaged shifting element and a previously disengaged shifting element is engaged.

Additionally, in the generic, unpublished patent application, namely, DE 102005002337.1 of the applicant, a multi-speed transmission is proposed, which possesses one input shaft, one output shaft, four mutually coupled individual planetary gear sets along with five shifting elements, whereby, eight forward gears are accessible without range shifting and also the proposal is such that when changing from one forward gear to the immediately next successive higher or lower forward moving gear, only one of the previously engaged shifting elements need be opened and only one of the previously disengaged shifting elements need be engaged. The multi-speed transmission also possesses a reverse gear. In all forward-travel gears and in the single reverse gear, respectively, three shifting elements are engaged. Considering the kinematic coupling of the four planetary gear sets among each other and the two shafts, namely for input and output, provision is made, that: a carrier of the fourth planetary gear set and the input shaft are bound together and form a first shaft of the transmission, a carrier of the third planetary gear set and the output shaft are bound together and form a second shaft of the transmission, a sun gear of the first planetary gear set and a sun gear of the fourth planetary gear are connected together to form a third shaft of the transmission, a ring gear of the first planetary gear set forms a fourth shaft of the transmission, a ring gear of the second planetary gear set and a sun gear of the third planetary gear set are bound together and form a fifth shaft of the transmission, a carrier of the first planetary gear set and a ring gear of the third planetary gear set are bound together and form a sixth shift of the transmission, a sun gear of the second planetary gear set and a ring gear of the fourth planetary gear set are bound together and form a seventh shaft of the transmission, and a carrier of the second planetary gear set forms an eighth shaft of the transmission. Further, considering the kinematic coupling of the fifth shifting element to the four planetary gear sets and to the input and output shafts, it is provided that placements are made, so that: the first shifting element in the power flow is between the third shaft and the transmission housing, the second shifting element is between the fourth shaft and the transmission housing, the third shifting element is between the first and fifth shafts, the fourth shifting element is either between the eighth and second shafts, or between the eighth and sixth shafts, and the fifth shifting element is either between the seventh and fifth shafts or between the fifth and eighth shafts.

Automatically shiftable vehicle transmissions, which are based on planetary gear sets, have, in general, been described many times in terms of the state of the technology and form the foundation of an on-going development and improvement thereof. These transmissions should possess a sufficient number of forward gears along with a single reverse gear and provide, for a motor vehicle, a very well adapted ratio selection with an advantageous spread. Further, these transmissions should enable high start-up ratios in the forward direction and should be suitable for installation both in passenger cars as well as in commercial vehicles. Beyond this, these transmissions should require a relatively small investment of money and labor for assembly, a relatively small number of shifting elements and sequential shifting arrangements for double clutching should be avoided. The result is, that in case of shifting in defined gear-groups, only one shifting element need be operated.

SUMMARY OF THE INVENTION

The present invention proposes a multi-speed transmission of the type described in the introductory passages, with at least eight, shiftable forward gears, which are free of range-shifting, and at least one reverse gear, for which, with the use of a total of four planetary gear sets, the least possible number of shifting elements will be required. Additionally, the proposed transmission is to exhibit a large ratio-spread with a comparatively harmonic gear succession and, at least in the principal driving gears, is to possess a favorable degree of efficiency and, comparatively, little slippage and tooth wear.

The invented multi-speed transmission, in accord with the invention, is based on planetary gear set construction, originating from the transmission drawing of the generic patent application DE 102005002337.1 of the applicant and possesses one input shaft, one output shaft, four mutually coupled planetary gear sets, at least eight rotatable shafts as well as five shifting elements (including two brakes and three clutches), the selective usage of which activates changeable ratios between the rotational speeds of the input shaft and the output shaft, so that eight forward gears and one reverse gear can be realized. In each gear, for example, three of the five shifting elements are engaged, whereby, in a change from one forward gear into the next successive higher or lower forward gear, only one of the previously engaged shifting elements is disengaged and only one of the previously disengaged shifting elements is engaged.

In accord with the invention, provision is made to the effect that:
- an input gear of the fourth planetary gear set and the input shaft are continually bound together and form the first shaft of the transmission,
- a carrier of the second planetary gear set, a carrier of the third planetary gear set and the input shaft are continually bound to one another and form the second shaft of the transmission,
- a sun gear of the first planetary gear set and a sun gear of the fourth planetary gear set are continually bound together and form the third shaft of the transmission,
- a ring gear of the first planetary gear set forms the fourth shaft of the transmission,
- a sun gear of the third planetary gear set forms the fifth shaft of the transmission,
- a carrier of the first planetary gear set and a ring gear of the third planetary gear set are mutually bound and form the sixth shaft of the transmission,
- a sun gear of the second planetary gear set and a carrier of the fourth planetary gear set are bound together and form the seventh shaft of the transmission,
- a ring gear of the second planetary gear set forms the eighth shaft of the transmission,
- the first shifting element, in the power flow, is placed between the third shaft and the transmission housing,
- the second shifting element, in the power flow, is placed between the fourth shaft and the transmission housing,
- the third shifting element, in the power flow, is placed between the first and the fifth shafts of the transmission,
- the fourth shifting element, in the power flow, is placed between the fifth and the eighth shafts of the transmission, and
- the fifth shifting element, in the power flow, is placed between the fifth and the seventh shaft of the transmission.

The inventive multi-speed transmission differs from the generic multi-speed transmission of DE 102005002337.1 to the extent that: (a) the ring gear of the fourth planetary gear set and the input shaft are continually bound together and form the first shaft of the transmission, (b) the second shaft of the transmission is now continually bound to the carrier of the second planetary gear set, (c) the fifth shaft of the transmission is now formed only by the sun gear of the third planetary gear set, (d) the sun gear of the second planetary gear set and the carrier of the fourth planetary gear set are continually bound together as the seventh shaft of the transmission, (e) the ring gear of the second planetary gear set forms the eighth shaft of the transmission, and (f) the fourth shifting element in the power flow is placed between the fifth and the eighth shaft of the transmission.

The generic multi-speed transmission as disengaged by DE 102005002337.1 further differs from the inventive multi-speed transmission, wherein the first forward gear is achieved by the engagement of the first, second, third shifting elements, the second forward gear is achieved by the engagement of the first, second and fifth shifting elements, the third forward gear is achieved by the engagement of the second, third, and fifth shifting elements, the fourth forward gear is achieved by the engagement of the second, fourth and fifth shifting elements, the fifth forward gear is achieved by the engagement of the second, third and fourth shifting elements, the sixth forward gear is achieved by the engagement of the third, fourth and fifth shifting elements, the seventh forward gear is achieved by the engagement of the first, third and fourth shifting elements, the eighth forward gear is achieved by the engagement of the first, fourth and fifth shifting elements and the reverse gear is achieved by the engagement of the first, second and fourth shifting elements.

Three of the four planetary gear sets are designed as a so-called negative planetary gear set, the planet gears of which mesh with the sun gear and ring gear of the given planetary gear set. One of the four planetary gear sets—namely the first planetary gear set—is designed as the so-called positive planetary gear set with inner and outer planet gears, which mesh together, whereby these inner planet gears also mesh with the sun gear of this plus planetary gear set, and whereby these outer planet gears also mesh with the ring gear of this plus planetary gear set. Giving consideration to the spatial arrangement of the four planetary gear sets within the housing of the transmission, it is proposed with regard to an advantageous embodiment, to place the four planetary gear sets coaxially aligned in sequential order, wherein they would be ordered as the "first, fourth, second and third planetary gear sets".

The spatial arrangement of the shifting elements of the inventive multi-speed transmission within the transmission housing is, principally, restricted only by the inside dimensions and the outer shape of the housing. A multitude of spacial requirements and the constructive arrangement of the shifting elements, for example, can be learned from DE 102005002337.1.

Thus, for example, provision may be made in a variant, but advantageous standard drive, that the first and the second shifting elements, seen with space allowances in mind, can be placed in an area radially located above the first or the fourth planetary gear sets, and that the third and fifth shifting elements, again spatially considered, can be at least partially axially placed between fourth and the second planetary gear sets, and that the fourth shifting element, with consideration to spatial requirements, can be positioned axially located, partially in an area between the second and third planetary gear sets. If, in this arrangement, the disk sets of the third and fifth shifting elements are placed essentially next to one another, then accordingly, the disk set of the third shifting element will be nearer to the fourth planetary gear set than is the disk set of the fifth shifting element. The possibility exists, however, that the third and the fifth shifting elements, with consideration to their spatial requirements, may be placed at least partially above one another, whereby the disk set of the fifth shifting element becomes placed, advantageously, on a diameter which is greater than the corresponding diameter for the disk set of the third shifting element. In a favorable design of the third and the fifth shifting elements, a common disk carrier is provided and, in accord with the drawing, is connected to the sun gear of the third planetary gear set. In the case of the shifting element arrangement, the fourth shifting element directly neighbors the second planetary gear set, whereby a disk set of the fourth shifting element, spatially considered, can be placed in an area, axially aligned, beside or radially above the second planetary gear set. Spatially considered, it is possible that the first and the second shifting elements are, at least partially, axially placed beside one another or at least partially located radially above one another.

By means of its inventive design, where passenger cars are concerned, the multi-speed transmission, offers appropriate ratios which have a large spread in a harmonic succession of gears. Moreover, with the inventive multi-speed transmission, by means of a small number of shifting elements, namely two brakes and three clutches, the expenditures for such an assembly are comparatively low. Additionally, with the inventive multi-speed transmission a satisfactory efficiency is attainable in all gears, first, due to the small loss in slippage, since in each gear only two shifting elements remain disengaged and second, due to low tooth wear losses in the uncomplicated structure of the individual planetary gear sets.

Further, it is advantageously possible, with the inventive multi-speed transmission, to carry out a start-up with a hydrodynamic converter, or with an external starting clutch or even with other outside start-up elements. Initiating drive can be executed with a start-up element integrated into the transmission. One of the two brakes which are activated in the first, second and reverse travel directions, is adaptable for this purpose.

In addition, the multi-speed transmission, in accord with the invention, is so designed, that it capable or adjustment for different drive train arrangements both in regard to the direction of power flows as well as in the allowance for occupied space when installed. Accordingly, it becomes possible, without particularly new design measures, to permit input and output shafts of the transmission to be optionally arranged either coaxially or axis-parallel to one another.

In regard to an arrangement where the input and output drives are to run coaxially in concert with one another, it is particularly advantageous, if the first planetary gear set is that planetary gear set of the inventive planetary gear set group which is proximal to the input side of the transmission. In accord with the spatial requirements of the five shifting elements within the transmission housing, provision can be made, that all four planetary gear sets, in an advantageous way, can be centrally and axially passed through, respectively, by at least one shaft of the transmission. Thus, in connection with a shifting element arrangement, where the four planetary gear sets are placed adjoiningly coaxially in a sequential order of, "first, fourth, second, and third planetary gear sets", the first and the second shifting elements are placed proximal to the input side in an area located radially above the first or the fourth planetary gear set, and the third, fourth and the fifth shifting elements are placed at least partially in an axially aligned area between the fourth and second planetary gear sets, and the first and fourth planetary gear sets are centrally passed through only by the first shaft of the transmission in an axial direction, while the second planetary gear set is centrally passed through only by the fifth shaft of the transmission in an axial direction and the third planetary gear set is not passed through by any shaft of the transmission. Correspondingly, the design of the pressure and lubrication feed to the servo-apparatuses of the individual shifting elements is without complexity.

For an application with the input and output shafts running axis parallel or angularly to one another, the first or the third planetary gear set can be placed on that side of the transmission housing, which is proximal to the input shaft which shaft is operationally bound to the drive motor of the transmission. If the first planetary gear set is proximal to the input drive of the transmission, then, provision can be made—as was done with the coaxial arrangement of the input/output shafts—with consideration given to the space requirements within the transmission housing of the five shifting elements, that all four planetary gear sets be respectively centrally passed through by a shaft of the transmission in the axial direction, i.e., that the first and the fourth planetary gear set be passed through only by the first shaft of the transmission and the second planetary gear set be only passed through by the fifth shaft of the transmission.

Alternately to the above, if in a connection where the input and output shafts are not aligned coaxially to one another and the third planetary gear set is proximal to the input drive of the transmission, the first and the fourth planetary gear set cannot be passed through by any shaft of the transmission in the axial direction. For example, referring to the above mentioned arrangement of shifting elements, where the third and the fifth shifting elements are placed axially between the second and the fourth planetary gear sets and the fourth shifting element is axially located between the second and the third planetary gear sets, then the second planetary gear set will be centrally passed through in the axial direction both by the fifth shaft of the transmission, as well as by the first shaft of the transmission, which runs coaxially within the fifth shaft, while the third planetary gear set is centrally passed through in the axial direction only by the first shaft.

In all cases, it is possible that the third shaft of the transmission, which is formed sectionally by the sun gears of the first and fourth planetary gear sets, can also be turnably affixed on a hub attached to the transmission housing. If the first planetary gear set is proximal to the input of the transmission, then, this said housing attached hub is a component of the input side transmission housing wall, or otherwise, a component of a transmission housing wall, which lies opposite to the drive motor.

BRIEF DESCRIPTION OF THE DRAWINGS

In the following, with the aid of the attached drawings, the invention will be explained and described in greater detail. The same, or essentially comparable components are, in the following, also designated with the same reference numbers. There is shown in.

DETAILED DESCRIPTION OF THE INVENTION

Figure 1:
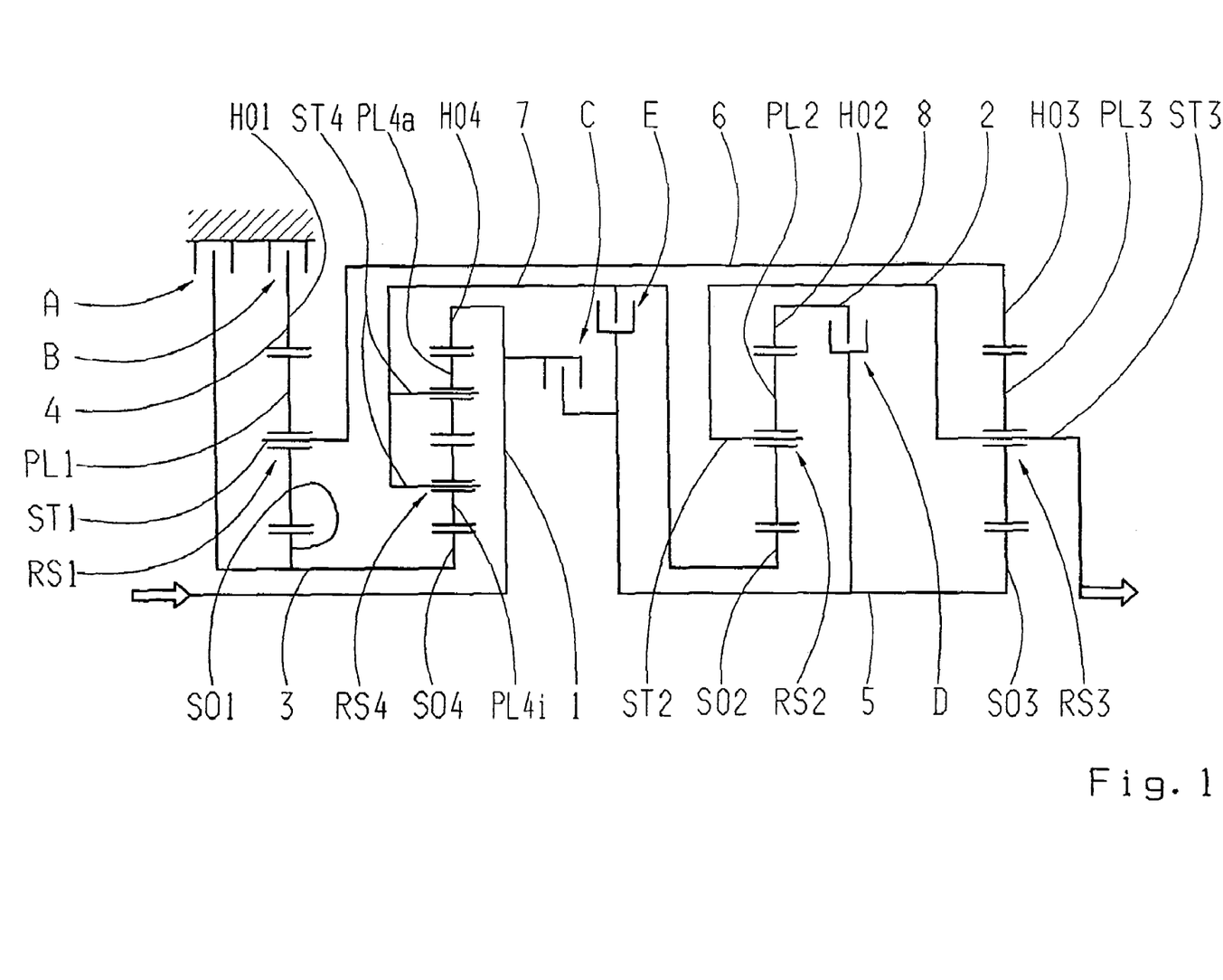
FIG. 1 a schematic illustration of an embodiment example of a multi-speed transmission in accord with the invention.

FIG. 1 shows an embodiment example of an inventive multi-speed transmission in a schematic presentation. The transmission includes one input shaft AN and one output shaft AB, as well as four planetary gear sets, namely RS1, RS2, RS3, RS4 and five shifting elements A, B, C, D, E, which are all contained in one housing GG of the transmission. The four planetary gear sets RS1, RS2, RS3, RS4, in this embodiment example, are shown in the sequential order of "RS1, RS4, RS2, RS3" and are placed coaxially to one another. The planetary gear sets RS1, RS2, and RS3 are designed as simple negative planetary gear sets. A negative planetary gear set possesses, as is known, planet gears, which mesh with the sun gear and internal gear of the same planetary gear set. The ring gears of planetary gear sets RS1, RS2, and RS3 are correspondingly designated with HO1, HO2 and HO3, the sun gears are shown as SO1, SO2 and SO3, while the planet gears are designated by PL1, PL2 and PL3, finally, the carriers, on which these planet gears are rotatably mounted, have the reference numbers ST1, SDT2 and ST3. The planetary gear set RS4 is designed as a simple positive planetary gear set, constructed in a double planetary manner. A positive planetary gear set possesses, inner and outer, mutually meshing planet gears, and these inner planet gears also mesh with the sun gear of the subject planetary gear set and the outer planet gears also mesh with the ring gear of the planetary gear set. The ring gear of the planetary gear set RS4 is designated as HO4, the sun gear as SO4, and the inner planet gears as PL4$i$, the outer planet gears being PL4$a$, the carrier, on which the inner and outer planet gears PL4$i$, PL4$a$ are rotatably affixed, is designated as ST4. The shifting elements A and B are designed to serve as brakes, which, in the embodiment here presented, act as frictional, shiftable disk brakes, obviously however, in another embodiment, these can also be frictional shiftable band brakes or, for example, they may also be made as shape-fit, shiftable, gripping or cone type brakes. The shifting elements C, D, and E are designed as clutches, which in the presented embodiment, are shown as friction based, shiftable disk clutches, obviously, in other applications, these can as well be shape-fit, shiftable gripping or cone type clutches. With these five shifting elements A to E, a selective shifting for eight forward gears and at least one reverse gear can be realized. The inventive multi-speed transmission possesses, as a whole, at least eight rotatable shafts, which are designated with the reference numbers 1 to 8.

In regard to the kinematic coupling of the individual elements of the four planetary gear sets RS1, RS2, RS3, RS4 with one another and with the input and output shafts AN, AB, the following is provided: the ring gear HO4 of the fourth planetary gear set RS4 and the input shaft AN are continually bound to one another and form shaft 1. The carriers ST2 and ST3 of the second and third planetary gear sets RS2 and RS3 and the output shaft AB are continually bound to one another and form shaft 2. The sun gears SO1, SO4 of the first and fourth planetary gear sets RS1, RS4 are continually bound to one another and form shaft 3. The ring gear HO1 of the first planetary gear set RS1 forms the shaft 4. The sun gear SO3 of the third planetary gear set RS3 forms the shaft 5. The carrier ST1 of the first planetary gear set RS1 and the ring gear HO3 of the third planetary gear set RS3 are continually bound to one another and form shaft 6. The sun gear SO2 of the second planetary gear set and the coupled carrier ST4 of the fourth planetary gear set RS4 are continually bound to one another and form shaft 7. The ring gear HO2 of the second planetary gear set RS2 forms the shaft 8.

Regarding the kinematic coupling of the five shifting elements A to E with the so-described shafts 1 to 8, the inventive multi-speed transmission has provision, in accord with FIG. 1, for the following: the brake A, serving as the first shifting element, is located in the power flow between the shaft 3 and the housing GG of the transmission. The brake B, serving as second shifting element, is located in the power flow between the shaft 4 and the housing GG. The clutch C, in the role of the third shifting element, is located in the power flow between the shaft 1 and the shaft 5. The clutch D, as the fourth shifting element, is located in the power flow between the shaft 5 and the shaft 8. The clutch E, serving as the fifth shifting element, is placed in the power flow between the shaft 5 and the shaft 7.

Shown in the embodiment illustrated in FIG. 1, the first planetary gear set RS1 of the transmission is that gear set which is proximal to the input shaft AN of the transmission and the third planetary gear set RS3 is that gear set which is proximal to the output shaft AB of the transmission, the input shaft AN and the output shaft AB run, for example, coaxially to one another. To the expert, it would be immediately obvious, that this transmission, without special effort, could be so modified, that the input and output shafts need not be coaxial to one another, but rather be axis-parallel or angularly disposed one to the other. In the case of an arrangement of this kind, the expert, upon need, can also place the input drive of the transmission in proximity to the third planetary gear set RS3, as well as on that side of the first planetary gear set RS3, which is remote from the first planetary gear set RS1.

Principally, it is possible that the installation space requirements of the shifting elements of the embodiment of a multi-speed transmission as shown in FIG. 1 could optionally be accommodated in the interior of the transmission and would be limited by the overall dimensions and external shape of the transmission housing GG.

In the embodiment presented in FIG. 1, the two brakes A and B, seen with respect given to their required occupying space are placed in the area of the first planetary gear set RS1, which is near to the input side, and are in axial alignment beside one another, the kinematic connection of the two brakes A, B to the first planetary gear set RS1, allows the brake B to be placed nearer to the fourth planetary gear set RS4 than the brake A, where planetary gear set RS4 is proximal to the first planetary gear set RS1. That is to say, that the brake A is placed nearer to input side of the transmission than the brake B. From a spatial standpoint, the brake B is placed at least partially in an area radially disposed above the first planetary gear set RS1 and the brake A, correspondingly, is located on the side of the first planetary gear set RS1 which is remote from the fourth planetary gear set RS4, i.e., the side being near to the input shaft AN. An inner disk carrier of the brake A forms a section of the shaft 3 of the transmission and is rotationally affixed to the sun gear SO1 on that side of the first planetary gear set RS1, which is remote from the fourth planetary gear set RS4. Sectionally, the shaft 3 is to serve as a type of sun gear shaft, which binds together the sun gears SO1 and SO4 of the planetary gear sets RS1 and RS4. In this way, it becomes possible that the shaft 3 can be rotatably supported on the input shaft AN as well as on a (not shown in greater detail in FIG. 1) transmission housing affixed hub. An inner disk carrier of the brake B forms a section of the shaft 4 of the transmission and is rotationally affixed with the ring gear HO1 of the first planetary gear set RS1. The servo-apparatuses necessary for activation of the frictional elements of the two brakes A and B are shown in an elementary manner in FIG. 1 for the sake of simplicity, and can, for example, be axially slidably installed in the transmission housing GG or integrated within a transmission housing affixed housing cover.

Upon need, the expert could easily modify, without excessive inventive effort, these exemplary, space connected, arrangements of the two brakes A and B. In this way, the brake A, for example, could also be at least partially placed radially over the first planetary gear set RS1 and the brake B can be installed at least partially radially above the fourth planetary gear set RS4. In still another embodiment of the present invention, it is possible that the two brakes A and B, for example, could be placed radially, one above the other, bordering on the first planetary gear set RS1 and on that side thereof, which is remote from the fourth planetary gear set RS4. If this is done, then the brake B is placed at a greater diameter than the brake A.

As may be further seen in FIG. 1, the clutches C and E, with regard to space conditions, are placed in an area located axially between the fourth and the second planetary gear sets RS4, RS2, while the clutch D, again spatially observed, can be at least located axially in an area between second and third planetary gear sets RS2, RS3. The servo-apparatuses necessary for activation of the disk sets of the three clutches C, D and E are indicated in FIG. 1, but, for the sake of clarity, are not shown in detail.

The clutch C directly and axially borders the fourth planetary gear set RS4. Accordingly, an outside disk carrier of the clutch C forms a section of the shaft 1 of the transmission and is connected with the ring gear HO4 of the fourth planetary gear set RS4 and with the input shaft AN on the side of the disk carrier packet of the clutch C which is proximal to the fourth planetary gear set RS4. An inner disk carrier of the clutch C forms a section of the shaft 5 of the transmission and is rotationally affixed to the sun gear SO3 of the third planetary gear set RS3. The servoapparatus necessary for the activation of the disk set of the clutch C can, for example, be placed within the cylindrical space, which formed by the outer disk carrier of the clutch C and the servoapparatus can also be slidingly mounted on this outer disk carrier of the clutch C, whereby it will rotate continually at the speed of rotation of the shaft 1, i.e., the input shaft AN. For the compensation of the rotational pressure developed by a rotating pressure chamber of this servoapparatus, a dynamic pressure compensation means can be provided in a known manner for the clutch C.

The clutch E is adjacent the second planetary gear set RS2. In this arrangement, the clutch E, with consideration given to spatial conditions, is placed in an area between the disk set of the clutch C and the second planetary gear set RS2. An outer disk carrier of the clutch E forms a section of the shaft 7 of the transmission and is rotationally affixed with both the coupled carrier ST4 of the fourth planetary gear set SR4 and the sun gear SO2 of the second planetary gear set RS2. In this way, the shaft 7 completely overlaps in its axial extent, the fourth planetary gear set RS4 and the clutch C. An inner disk carrier of the clutch E forms a section of the shaft 5 of the transmission and is—as is also the inner disk carrier of the clutch C—rotationally affixed to the sun gear SO3 of the third planetary gear set RS3. In this way, it is possible, that a technological advantage in the manufacturing of the clutches C and E can be found, that being a common disk carrier for the two can be provided. The servoapparatus necessary for the activation of the disk set of the clutch E can, for example, be slidingly and axially mounted on the inner disk carrier of the clutch E, such that the servoapparatus would then rotate at the same rotational speed as the shaft 5. The servoapparatus of the clutch E can, however, also be so mounted on the outer disk carrier of the clutch E such that it would rotate at the rotational speed of the shaft 7. In the same manner as the clutch C, the clutch E can also be provided with a dynamic pressure compensation device.

Deviating now from the embodiment presented in FIG. 1, it is possible that in another embodiment of the transmission, provision can be made, where the two clutches C and E would be united to form a premounted, i.e., factory assembled, component group. This component group would include disk sets for the clutches C and E, these sets would be radially mounted, one over the other, and would include a common disk carrier as well as servo apparatuses for the activation of the respective disk set of each clutch C and E. Further, in this case, the disk set of the clutch C would be placed radially beneath the disk packet of the clutch E. In such a case, the common disk carrier can serve for the (radial inner) clutch C as an outside disk carrier and for the (radial outer) clutch E as an inner disk carrier. In addition, the common disk carrier would form a section of the shaft 5 of the transmission and can be permanently bound to the sun gear SO3 of the third planetary gear set RS3. Both the servo-apparatuses are axially and slidably mounted on the common disk carrier.

Further information from FIG. 1 disengages, that the clutch D directly and axially borders the second planetary gear set RS2. Accordingly, an outer disk carrier of the clutch D forms a section of the shaft 8 of the transmission and is rotationally affixed to the ring gear HO2 of the second planetary gear set RS2. An inner disk carrier of the clutch D forms a section of the shaft 5 of the transmission and is rotationally affixed to the sun gear SO3 of the third planetary gear set RS3 and also with the two inner disk carriers of the clutches C and E. The servoapparatus necessary for the activation of the disk set of the clutch D can be axially and slidably mounted on the inner disk carrier of the clutch D, whereby it will rotate continually at the same rotational speed as the shaft 5. To compensate for the pressure induced by the rotation of the rotating pressure chamber, in a known manner, the servoapparatus of the clutch D can be provided with a dynamic pressure compensation means.

In another embodiment of the transmission, deviating from that of FIG. 1, it is possible that, for example, provision can be made for saving of axial length of the transmission, the disk set of the clutch D, with consideration given to spatial conditions, can be placed in an area located radially above the second planetary gear set RS2. Advantageously, in this case the inner disk carrier of the clutch D, serving as a section of the shaft 8 of the transmission, is rotationally affixed to the ring gear HO2 of the second planetary gear set RS2, while the outer disk carrier of the clutch D forms a section of the shaft 5 of the transmission and, corresponding to the illustrated transmission, is continually bound to the sun gear SO3 of the third planetary gear set RS3. In this case, the servoapparatus of the clutch D is advantageously axially and slidably mounted on outer disk carrier and accordingly rotates at the same rotational speed as does the shaft 5.

Corresponding to the illustrated transmission, a sequential order of "RS1, RS4, RS2, RS3" represents the spatial succession of the four planetary gear sets in an axially, contingent manner and the three clutches are axially located in an area between the fourth and third planetary gear sets RS4 and RS3. The shaft 6 in its axial extent completely overlaps the fourth planetary gear set RS4, the clutches C and E, the second planetary gear set RS2 as well as the clutch D.

It should be expressly stated, that the above described arrangement of the three clutches C, D and E is to be regarded only as exemplary in character. Upon need, the expert could also modify these examples of the spatial arrangement of the three clutches, C, D, and E. Numerous options of possible alternate arrangements are found in the generic patent application DE 102005002337.1. Thus, for example, without significantly changing the component structure of the transmission exhibited in FIG. 1, provision can be made that the disk set of the clutch E, with respect to spacial conditions, can be at least partially located radially above the disk set of the clutch C, and at the same time, the clutch E can be located, spatially considered, at least partially radially above the clutch C.

Figure 2:
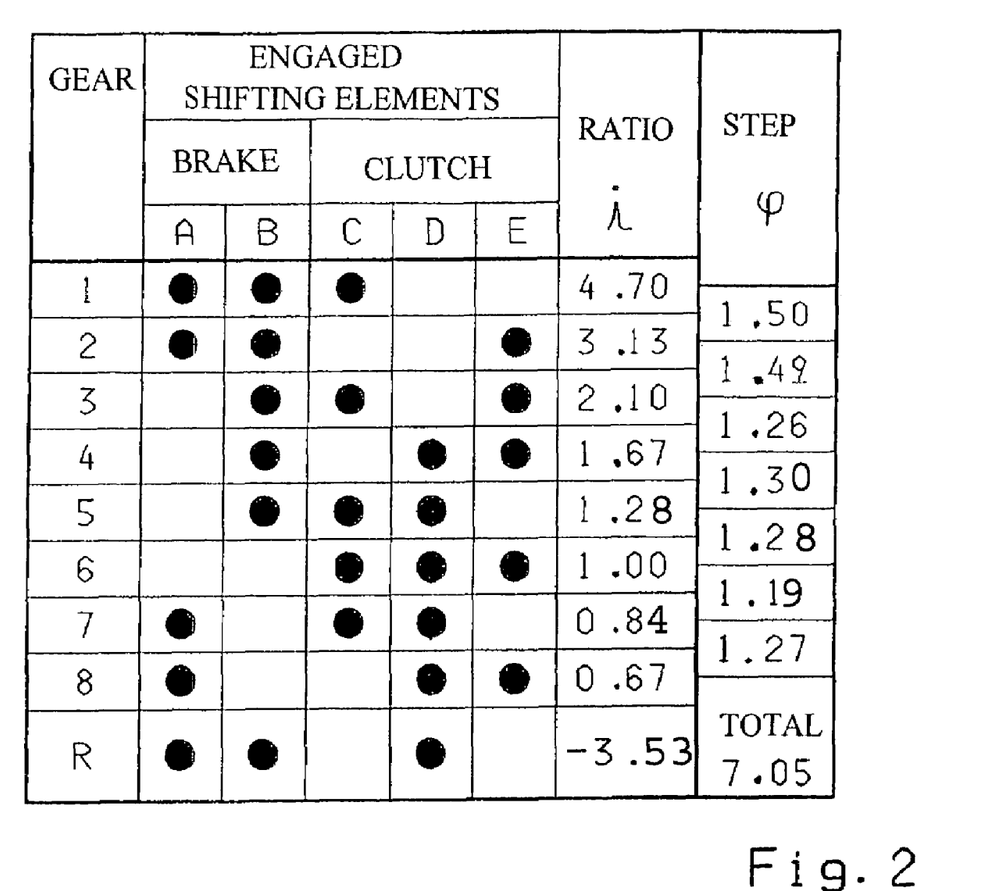
FIG. 2 an exemplary shifting diagram for the multi-speed transmission of FIG. 1.

Presented in FIG. 2, is a shifting diagram of the inventive multi-speed transmission in accord with FIG. 1. In each gear, three shifting elements are engaged, and two shifting elements are open. Besides the logic of the shifting diagram, considerable value may be granted to the respective ratios of the individual gears and to the therefrom determinable stage spread φ. The given ratios i are taken from the (typical) stationary transmission ratios of the four planetary gear sets RS1, RS2, RS3, RS4, these ratios being −2.00, −1.70, −3.70 and +3.00. Further, from the shifting diagram may be learned, that successive shifting of the double shift type, also known as range shifting, can be avoided, since two neighboring gears in the shifting logic use two shifting elements in common. The sixth shifting stage is designed as a direct gear.

The first forward gear is achieved by engaging the brakes A and B and the clutch C, the second forward gear attains the same end by engaging the brakes A and B and the clutch E. The third forward gear is reached by means of engaging the brake B and the clutches C and E. The fourth forward gear is obtained by engaging the brake B and the clutches D and E. The fifth forward gear is obtained by the engaging of the brake B and the clutches C and D. The sixth forward gear is obtained by engaging the clutches C, D and E, while the seventh gear is reached by engaging the brake A and the clutches C and D. Finally, the eighth forward gear is obtained by engaging the brake A and the clutches D and E. As may be further inferred from the shifting diagram, the reverse gear is obtained by the engaging of the brakes A and B and the clutch D.

In accord with the invention, initiating drive of a motor vehicle having a shifting element, which is integrated within the transmission, is entirely possible. A shifting element would be particularly well adapted for this operation, if the shifting element is required for both the first forward gear as well as for the reverse gear. In an advantageous manner, the brake A or the brake B meet this condition. Further, advantageously, these two brakes prove to be needed in the second forward gear. If the brake B is used as a start-up element which integrated in the transmission, then a start-up is even possible in the first five forward gears as well as in the reverse gear. As may be seen in the shifting diagram, even the clutch C can be applied to enable a start-up in the forward direction and for starting up in the reverse direction, the clutch D would be used to serve as an internal transmission start-up element.

For the previously presented and described embodiments of the inventive multi-speed, transmission, the following statements are valid:

In accord with the invention, the possibility exists that different gear spreads arise, even among identical transmission drawings in accord with given stationary ratios of gears of planetary gear sets, whereby performance variations in applications and vehicle operations can be created.

Figure 8:
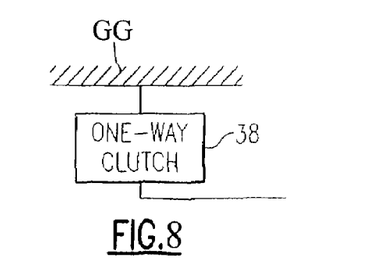
FIG. 8, a diagrammatic view of an embodiment of the inventive multi-speed transmission having a one-way clutch.

It is additionally possible, as shown in FIG. 8, at each thereto adaptable gear position of the multi-speed transmission, to provide additional one-way clutches 38, for instance, between a shaft and housing or possibly, in connecting two shafts.

Figure 3:
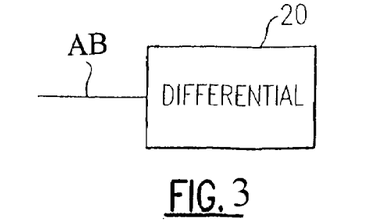
FIG. 3, a diagrammatic view of an embodiment of the inventive multi-speed transmission having a differential.

One can also place an axle differential 20 and/or a transfer differential on input or output sides, as shown in FIG. 3.

Figure 4:
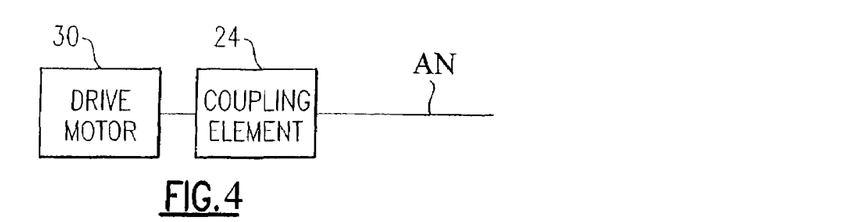
FIG. 4, a diagrammatic view of an embodiment of the inventive multi-speed transmission with a coupling element and a drive motor.
Figure 5:
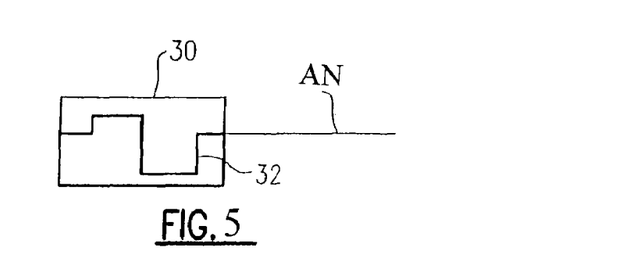
FIG. 5, a diagrammatic view of an embodiment of the inventive multi-speed transmission with a crankshaft of the drive motor fixed to an input shaft of the multi-speed transmission.
Figure 12:
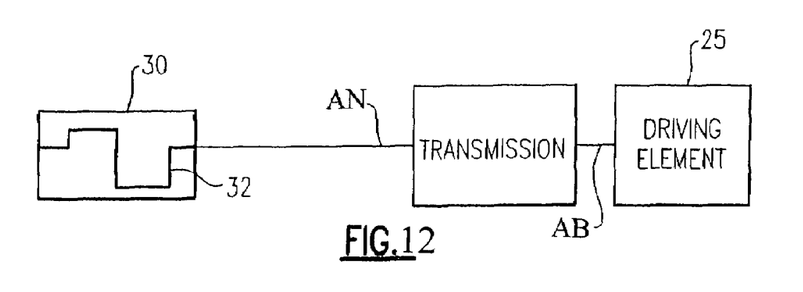
FIG. 12, a diagrammatic view of another embodiment of the inventive multi-speed transmission with the crankshaft of the drive motor fixed to the input shaft of the multi-speed transmission and the coupling element located behind the multi-speed transmission.

Within the limits of an advantageous development, as shown in FIG. 4, it is possible that an input shaft AN can be separated from the main drive motor in case of need, by the insertion of a coupling element 24, which element would be composed of, for example: a hydrodynamic converter, a hydraulic clutch, a dry start-up clutch, a wet start-up clutch, a magnetic powder clutch or a centrifugal force clutch. It is also allowable, as shown in FIG. 12, to place a driving element 25 in the direction of power flow behind the transmission, whereby, the input shaft AN would be continually bound to the crankshaft 32 of the drive motor 30, as shown in FIG. 5.

Figure 6:
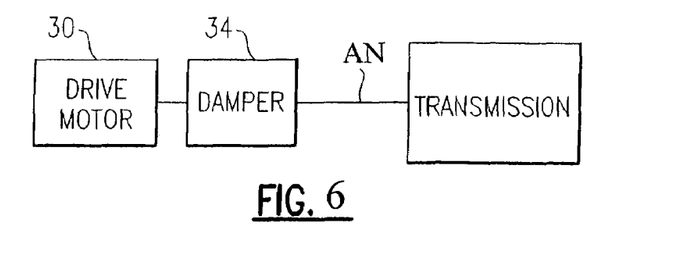
FIG. 6, a diagrammatic view of an embodiment of the inventive multi-speed transmission having the drive motor communicating with a damper.

The inventive multi-speed transmission further enables, as shown in FIG. 6, the placement of a tortional vibration damper 34 between the drive motor 30 and the transmission.

Figure 7:
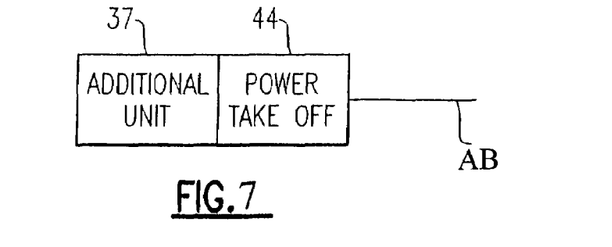
FIG. 7, a diagrammatic view of an embodiment of the inventive multi-speed transmission with a power take-off for driving an additional unit.
Figure 10:
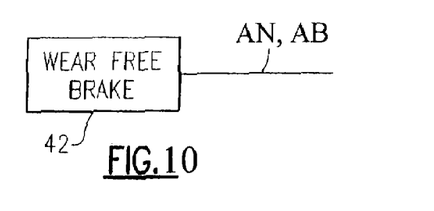
FIG. 10, a diagrammatic view of a preferred design of the inventive multi-speed transmission having a wear free brake.
Figure 11:
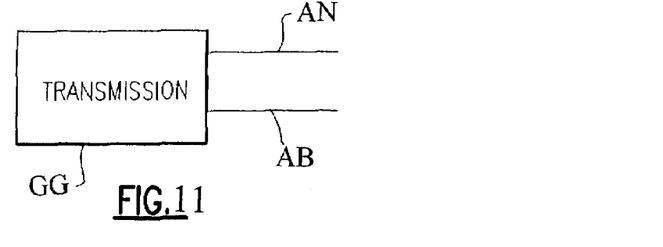
FIG. 11, a diagrammatic view of a further embodiment of the invention with the input and the output being provided on the same side of the multi-speed transmission housing.

Within the framework of an advanced embodiment of the invention, shown in FIG. 10, it is possible to place upon each shaft, preferentially on the input shaft AN or on the output shaft AB, a wear-free brake 42, such as, for example, a hydraulic or an electrical retarder orthe like, which is of particular importance especially for installation in commercial vehicles. Moreover, as shown in FIG. 7 it is possible to provide a power take-off 44 on each shaft, preferably on the input shaft AN or on the output shaft AB to drive additional units 37. Additionally, as shown in FIG. 11, the input and the output are provided on the same side of the housing GG.

The installed shift elements can be designed as power shifting clutches or power-shift brakes. In particular, friction-locking clutches or friction-locking brakes, for example, multi-disk clutches or band brakes and/or conical clutches. Further, it is possible to employ as shifting elements form-fit brakes and/or form-fit clutches such as, for example, synchronization clutches or claw clutches.

Figure 9:
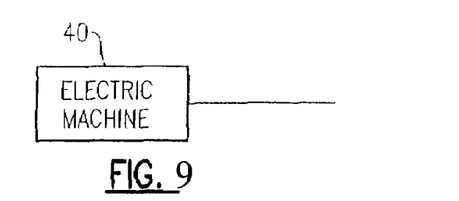
FIG. 9, a diagrammatic view of an embodiment of the inventive multi-speed transmission with an electric machine.

An added advantage of the here presented multi-speed transmission, shown in FIG. 9, is that on each shaft, an electrical machine 40 can be additionally installed to serve as a generator or to power an additional drive unit.

Obviously every constructive improvement, especially any spatial arrangement of the planetary gears and the shifting elements, individually or in combination, which prove technically advantageous, fall under the protection of the attendant claims, without affecting the function of the transmission as this is presented in the claims, even wherein such improved objects or functions may not be explicitly presented in the drawing or in the description.

REFERENCE NUMBERS AND
CORRESPONDING COMPONENTS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gear set
HO1 ring gear of the first planetary gear set
SO1 sun gear of the first planetary gear set
ST1 carrier of the first planetary gear set
PL1 planet gears of the first planetary gear set
RS2 second planetary gear set
HO2 ring gear of the second planetary gear set
SO2 sun gear of the second planetary gear set
ST2 carrier of the second planetary gear set
PL2 planet gears of the second planetary gear set
RS3 third planetary gear set
HO3 ring gear of the third planetary gear set
SO3 sun gear of the third planetary gear set
ST3 carrier of the third planetary gear set
PL3 planet gears of the third planetary gear set
RS4 fourth planetary gear set
HO4 ring gear of the fourth planetary gear set
SO4 sun gear of the fourth planetary gear set
ST4 carrier of the fourth planetary gear set
PL4a outer planet gears of the fourth planetary gear set
PL4i inner planet gears of the fourth planetary gear set
i ratio
φ Gear spread (ratio difference)

Claimed is:

1. A multi-speed automatic transmission of a planetary design for a motor vehicle, the transmission comprising:
   an input shaft (AN);
   an output shaft (AB);
   first, second, third and fourth planetary gearsets (RS1, RS2, RS3, RS4), and each of the first, the second, the third and the fourth planetary gearsets (RS1, RS2, RS3, RS4) comprising a sun gear, a carrier and a ring gear;
   at least first, second, third, fourth, fifth, sixth, seventh and eighth rotatable shafts (1, 2, 3, 4, 5, 6, 7, 8) and first, second, third, fourth and fifth shifting elements (A, B, C, D, E), whose selective engagement creates different gear ratios between the input shaft (AN) and the output shaft (AB) so that eight forward gears and at least one reverse gear can be implemented;
   wherein the ring gear (HO4) of the fourth planetary gearset (RS4) and the input drive shaft (AN) are permanently connected and form the first shaft (1);
   the carrier (ST2) of the second gearset (RS2), the carrier (ST3) of the third planetary gearset (RS3) and the output drive shaft (AB) are permanently connected and form the second shaft (2);
   the sun gear (SO1) of the first planetary gearset (RS1) and the sun gear (SO4) of the fourth planetary gearset (RS4) are permanently connected and form the third shaft (3);
   the ring gear (HO1) of the first planetary gearset (RS1) forms the fourth shaft (4);
   the sun gear (SO3) of the third planetary gearset (RS3) forms the fifth shaft (5);
   the carrier (ST1) of the first planetary gearset (RS1) and the ring gear (HO3) of the third planetary gear (RS3) are permanently connected and form the sixth shaft (6);
   the sun gear (SO2) of the second planetary gearset (RS2) and the carrier (ST4) of the fourth planetary gearset (RS4) are permanently connected and form the seventh shaft (7);
   the ring gear (HO2) of the second planetary gearset (RS2) forms the eighth shaft (8);
   the first shifting element (A) is arranged between the third shaft (3) and a transmission housing (GG) of the transmission;
   the second shifting element (B) is arranged between the fourth shaft (4) and the transmission housing (GG) of the transmission;
   the third shifting element (C) is arranged, in a direction of power flow, between the first shaft (1) and the fifth shaft (5);
   the fourth shifting element (D) is arranged, in the direction of power flow, between the fifth shaft (5) and the eighth shaft (8); and
   the fifth shifting element (E) is arranged, in the direction of power flow, between the fifth shaft (5) and the seventh shaft (7).

2. The multi-speed transmission according to claim 1, wherein:
   a first forward gear is achieved by engagement of the first shifting element (A), the second shifting element (B) and the third shifting element (C);
   a second forward gear is achieved by engagement of the first shifting element (A), the second shifting element (B), and the fifth shifting element (E);
   the third forward gear is achieved by engagement of the second shifting element (B), the third shifting element (C) and the fifth shifting element (E);
   a fourth forward gear is achieved by engagement of the second shifting element (B), the fourth shifting element (D) and the fifth shifting element (E);
   a fifth forward gear is achieved by engagement of the second shifting element (B), the third shifting element (C) and the fourth shifting element (D);
   a sixth forward gear is achieved by engagement of the third shifting element (C) the fourth shifting element (D) and the fifth shifting element (E);
   a seventh forward gear is achieved by engagement of the first shifting element (A), the third shifting element (C) and the fourth shifting element (D);
   a eighth forward gear is achieved by engagement of the first shifting element (A), the fourth shifting element (D) and the fifth shifting element (E); and
   a reverse gear is achieved by engagement of the first shifting element (A), the second shifting element (B) and the fourth shifting element (D).

3. The multistage transmission in accordance with claim 1, wherein the first planetary gearset (RS1), the second planetary gearset (RS2) and the third planetary gearset (RS3) are all negative planetary gearsets, and the fourth planetary gearset (RS4) is a positive planetary gearset.

4. The multistage transmission in accordance with claim 1, wherein the first planetary gearset (RS1), the second planetary gearset (RS2), the third planetary gearset (RS3) and the fourth planetary gearset (RS4) are co-axial and arranged, in an axial direction, in a sequential order of:
the first planetary gearset (RS1), the fourth planetary gearset (RS4), the second planetary gearset (RS2), and the third planetary gearset (RS3).

5. The multistage transmission in accordance with claim 1, wherein the input shaft (AN) is one of axially parallel and at an angle to the output shaft (AB), and one of the first planetary gearset (RS1) and the third planetary gearset (RS3) is located on a side of the transmission housing (GG) closest to a drive motor which is connected to the input shaft (AN) of the transmission.

6. The multistage transmission in accordance with claim 1, wherein the input shaft (AN) is co-axial with the output shaft (AB), and the first planetary gearset (RS1) is located on a side of the transmission housing (GG) closest a drive motor which is connected to the input shaft (AN).

7. The multistage transmission in accordance with claim 1, wherein each of the first planetary gearset (RS1), the second planetary gearset (RS2), the third planetary gearset (RS3) and the fourth planetary gearset (RS4) are respectively radially centrally passed through in an axial direction, by only a maximum of one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8).

8. The multistage transmission in accordance with claim 1, wherein the first planetary gearset (RS1) and the fourth planetary gearset (RS4) are centrally passed through, in an axial direction, by only the first shaft (1) and the second planetary gearset (RS2) is centrally passed through, in the axial direction, by only the fifth shaft (5).

9. The multistage transmission in accordance with claim 1, wherein neither the first planetary gearset (RS1) and the fourth planetary gearset (RS4) is centrally passed through by any of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8), the second planetary gearset (RS2) is axially, centrally passed through by both the fifth shaft (5) and the first shaft (1), and the first shaft (1) is coaxial with the fifth shaft (5) and the third planetary gearset (RS3) is axially, centrally passed through by only the first shaft (1).

10. The multistage transmission in accordance with claim 1, wherein the third shaft (3) is rotatably connected to a hub which is connectable to the transmission housing (GG).

11. The multistage transmission in accordance with claim 1, wherein at least one of the first shifting element (A) and the second shifting element (B) is radially located at least partially above one of the first planetary gearset (RS1) and the fourth planetary gearset (RS4).

12. The multistage transmission in accordance with claim 1, wherein the first shifting element (A) is adjacent the second shifting element (B) and at least one friction element of the second shifting element (B) is located closer to the fourth planetary gearset (RS4) than a friction element of the first shifting element (A).

13. The multistage transmission in accordance with claim 1, wherein one of the first shifting element (A) is radially located above the second shifting element (B) and the second shifting element (B) is radially located above the first shifting element (A).

14. The multistage transmission in accordance with claim 1, wherein the third shifting element (C) is axially located at least partially between the fourth planetary gearset (RS4) and the second planetary gearset (RS2).

15. The multistage transmission in accordance with claim 1, wherein the third shifting element (C) is directly axially adjacent the fourth planetary gearset (RS4).

16. The multistage transmission in accordance with claim 1, wherein the fifth shifting element (E) is axially located at least partially between the fourth planetary gearset (RS4) and the second planetary gearset (RS2).

17. The multistage transmission in accordance with claim 1, wherein the fifth shifting element (E) is axially adjacent the second planetary gearset (RS2).

18. The multistage transmission in accordance with claim 1, wherein the third shifting element (C) is adjacent the fifth shifting element (E), and a disk set of the third shifting element (C) is located closer to the fourth planetary gearset (RS4) than a disk set of the fifth shifting element (E).

19. The multistage transmission in accordance with claim 1, wherein the third shifting element (C) and the fifth shifting element (E) are located at least partially one above another, and a disk set of the fifth shifting element (E) is radially located at least partially above a disk set of the third shifting element (C).

20. The multistage transmission in accordance with claim 1, wherein the third shifting element (C) and the fifth shifting element (E) have a common disk carrier, which is fixed to the sun gear (SO3) of the third planetary gearset (RS3).

21. The multistage transmission in accordance with claim 1, wherein the fourth shifting element (D) is axially located at least partially between the second planetary gearset (RS2) and the fourth planetary gearset (RS4).

22. The multistage transmission in accordance with claim 1, wherein the fourth shifting element (D) is directly adjacent the second planetary gearset (RS2).

23. The multistage transmission in accordance with claim 1, wherein a disk set of the fourth shifting element (D) is radially placed at least partially above the second planetary gear set (RS2).

24. The multistage transmission in accordance with claim 1, wherein the sixth shaft (6) completely overlies, in an axial direction, the fourth planetary gearset (RS4), the second planetary gearset (RS2), the third shifting element (C), the fifth shifting element (E) and the fourth shifting element (D).

25. The multistage transmission in accordance with claim 1, wherein at least one one-way clutch is located between at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) and the transmission housing (GG).

26. The multistage transmission in accordance with claim 1, wherein the input shaft (AN) and the output shaft (AB) of the transmission are provided on opposite sides of the transmission housing (GG).

27. The multistage transmission in accordance with claim 1, wherein the input shaft (AN) and the output shaft (AB) of the transmission are located on a common side of the transmission housing (GG).

28. The multistage transmission in accordance with claim 1, wherein at least one of an axle differential and a distributor differential is located on one of an input side and an output side.

29. The multistage transmission in accordance with claim 1, wherein a coupling element is located, in the direction of the power flow, between a drive motor and the input shaft (AN).

30. The multistage transmission in accordance with claim 1, the coupling element is one of a hydrodynamic converter, a hydraulic clutch, a dry starting clutch, a wet starting clutch, a magnetic-power clutch and a centrifugal clutch.

31. The multistage transmission in accordance with claim 1, wherein the vehicle is started via one of the first shifting element (A), the second shifting element (B), the third shifting element (C) and the fourth shifting element (D), and the input shaft (AN) is permanently connected to a crankshaft of a drive motor in one of a rotationally fixed manner and a rotationally elastic manner.

32. The multistage transmission in accordance with claim 31, wherein the vehicle is started in at least one of a forward direction and a reverse direction via one of the first shifting element (A) and the second shifting element (B).

33. The multistage transmission in accordance with claim 1, wherein one of a wear free brake, a power take-off for driving an additional unit, an electric machine is fixed to at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8), and the electric machine is at least one of a generator and an additional drive unit.

34. The multistage transmission in accordance with claim 1, wherein each of the first shifting element (A), the second shifting element (B), the third shifting element (C), the fourth shifting element (D) and the fifth shifting element (E) is one of a friction-locking clutch, a friction-locking brake, a disc clutch, a band brake, a conical clutch, a form-fit clutch, a form-fit brake, a conical clutch and a claw clutch.

* * * * *